(12) United States Patent
Schmidt et al.

(10) Patent No.: US 10,963,459 B2
(45) Date of Patent: Mar. 30, 2021

(54) GENERIC UTILIZATION OF ON-PREMISE QUERY FRAMEWORKS BY NEW ON-DEMAND APPLICATIONS

(71) Applicant: SAP SE, Walldorf (DE)

(72) Inventors: Olaf Schmidt, Walldorf (DE); Martin P. Fischer, Heidelberg (DE)

(73) Assignee: SAP SE, Walldorf (DE)

( * ) Notice: Subject to any disclaimer, the term of this patent is extended or adjusted under 35 U.S.C. 154(b) by 805 days.

(21) Appl. No.: 14/473,468

(22) Filed: Aug. 29, 2014

(65) Prior Publication Data
US 2016/0063056 A1    Mar. 3, 2016

(51) Int. Cl.
| | |
|---|---|
| *G06F 16/245* | (2019.01) |
| *G06Q 10/06* | (2012.01) |
| *G06F 16/84* | (2019.01) |
| *G06F 16/28* | (2019.01) |
| *G06F 21/62* | (2013.01) |
| *H04L 12/803* | (2013.01) |

(52) U.S. Cl.
CPC .......... *G06F 16/245* (2019.01); *G06F 16/283* (2019.01); *G06F 16/84* (2019.01); *G06F 21/6218* (2013.01); *G06Q 10/06* (2013.01); *H04L 47/125* (2013.01)

(58) Field of Classification Search
None
See application file for complete search history.

(56) References Cited

U.S. PATENT DOCUMENTS

| | | | |
|---|---|---|---|
| 6,697,808 B1 * | 2/2004 | Hurwood | ............... G06Q 10/10 |
| 7,222,142 B2 | 5/2007 | Fischer et al. | |
| 7,457,933 B2 | 11/2008 | Pferdekamper et al. | |

(Continued)

OTHER PUBLICATIONS

Carl Lagoze; Metadata Aggregation and "Automated Digital Libraries": A Restropsective on the NSDL Experience; 2006; ACM; pp. 230-239.*

(Continued)

*Primary Examiner* — Mariela Reyes
*Assistant Examiner* — Jermaine A Mincey
(74) *Attorney, Agent, or Firm* — Fish & Richardson P.C.

(57) ABSTRACT

The present disclosure describes methods, systems, and computer program products for allowing reuse of existing query frameworks to build new on-demand services. One design-time computer-implemented method includes transmitting a request for available reports to a report repository which is transmitted to a generic report provider on a backend enterprise reporting planning (ERP) system, transmitting a request to a report catalog user interface for a selected report returned by the generic report provider, transmitting a request for metadata to the generic report provider. One run-time computer-implemented method includes receiving a data request for bound result set elements provided by on-demand services, checking authorization for access using an authorizations repository, requesting routing information for applicable back-end ERP systems from a report repository, routing requests to a generic report provider of an appropriate backend ERP system, and triggering a report execution using a corresponding adapter for a query framework on the ERP system.

20 Claims, 4 Drawing Sheets

(56) References Cited

U.S. PATENT DOCUMENTS

| | | |
|---|---|---|
| 7,653,667 B2 | 1/2010 | Pferdekamper et al. |
| 7,693,881 B2 | 4/2010 | Fischer et al. |
| 7,693,890 B2 | 4/2010 | Fischer et al. |
| 7,707,176 B2 | 4/2010 | Schmidt |
| 7,756,813 B2 | 7/2010 | Pferdekamper et al. |
| 7,756,814 B2 | 7/2010 | Fischer et al. |
| 7,827,160 B2 | 11/2010 | Kuhr et al. |
| 7,844,890 B2 | 11/2010 | Schmidt |
| 7,975,013 B2 | 7/2011 | Schmidt |
| 8,090,754 B2 | 1/2012 | Schmidt et al. |
| 8,099,423 B2 * | 1/2012 | Meyer ............... G06F 17/30722 707/758 |
| 8,200,775 B2 * | 6/2012 | Moore ................. G06F 19/325 709/217 |
| 8,219,974 B2 | 7/2012 | Schmidt |
| 8,484,206 B2 | 7/2013 | Schmidt et al. |
| 8,635,684 B2 | 1/2014 | Thun |
| 8,719,833 B2 | 5/2014 | Schmidt |
| 2007/0179975 A1 * | 8/2007 | Teh ....................... G06Q 10/10 |
| 2008/0154977 A1 | 6/2008 | Schmidt |
| 2008/0154994 A1 | 6/2008 | Fischer et al. |
| 2008/0243781 A1 | 10/2008 | Kuhr et al. |
| 2008/0263007 A1 | 10/2008 | Schmidt |
| 2009/0150168 A1 | 6/2009 | Schmidt |
| 2009/0150431 A1 | 6/2009 | Schmidt et al. |
| 2009/0150866 A1 | 6/2009 | Schmidt |
| 2009/0150906 A1 | 6/2009 | Schmidt et al. |
| 2010/0287553 A1 | 11/2010 | Schmidt et al. |
| 2011/0321058 A1 | 12/2011 | Schmidt |
| 2012/0030180 A1 | 2/2012 | Klevenz et al. |
| 2012/0246130 A1 | 9/2012 | Schmidt |
| 2012/0303575 A1 * | 11/2012 | Crolene ............ G06F 17/30489 707/609 |
| 2013/0018926 A1 | 1/2013 | Schmidt et al. |
| 2013/0117289 A1 | 5/2013 | Fischer et al. |
| 2013/0159468 A1 * | 6/2013 | Kusterer ............. H04L 67/2823 709/219 |
| 2014/0012767 A1 | 1/2014 | Schmidt |
| 2014/0123263 A1 | 5/2014 | Thun |
| 2014/0143248 A1 * | 5/2014 | Gembalzyk ....... G06F 17/30554 707/737 |
| 2014/0280334 A1 * | 9/2014 | LeBlanc ............. G06F 21/6227 707/770 |
| 2015/0310085 A1 * | 10/2015 | Tee ......................... H04L 41/22 707/737 |
| 2016/0063056 A1 * | 3/2016 | Schmidt ................ G06F 16/245 707/603 |

OTHER PUBLICATIONS

U.S. Appl. No. 13/543,254, filed Jul. 6, 2012, Olaf Schmidt.
U.S. Appl. No. 13/575,158, filed Feb. 1, 2013, Olaf Schmidt et al.
U.S. Appl. No. 13/738,686, filed Jan. 10, 2013, Olaf Schmidt.

* cited by examiner

GENERIC UTILIZATION OF ON-PREMISE QUERY FRAMEWORKS BY NEW ON-DEMAND APPLICATIONS

BACKGROUND

Organizations have invested large amounts of time and money for the definition and implementation of application functionalities, including ad-hoc ("on-the-fly" for a particular purpose) reporting and other functionalities, based on existing query frameworks in on-premise enterprise resource planning (ERP) systems. The implementations can also include definitions of roles with corresponding user privileges for data access to business data. Today, many business applications are being migrated from an on-premise to an on-demand model requiring existing functionality to be re-implemented in the context of cloud-computing platforms. Advantages of having business applications in a cloud-computing environment include lower maintenance costs and simpler support for new end-consumer devices (e.g., mobile phones, tablets, etc.) when exposing business services allowing access to productive data in an existing on-premise landscape of a customer. Requirements for organizations regarding making existing application functionality available in the "cloud" relate to saving prior investment costs in implementations based on on-premise technologies.

SUMMARY

The present disclosure relates to computer-implemented methods, computer-readable media, and computer systems for allowing reuse of existing on-premise query frameworks to build new on-demand services. In a first implementation, one design-time computer-implemented method includes transmitting a request for available reports to a report repository which is transmitted to a generic report provider on a backend enterprise reporting planning (ERP) system, transmitting a request to a report catalog user interface for a selected report returned by the generic report provider, transmitting a request for metadata to the generic report provider. In a second implementation, one run-time computer-implemented method includes receiving a data request for bound result set elements provided by on-demand services, checking authorization for access using an authorizations repository, requesting routing information for applicable back-end ERP systems from a report repository, routing requests to a generic report provider of an appropriate backend ERP system, and triggering a report execution using a corresponding adapter for a query framework on the ERP system.

Other implementations can include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

For the first implementation:

A first aspect, combinable with the general implementation, wherein the available reports are cached.

A second aspect, combinable with any of the previous aspects, wherein the metadata includes a description of result set structure and data types of fields and is generated as an ODATA metadata document.

A third aspect, combinable with any of the previous aspects, comprising wherein the metadata is cached by the report data model repository to reduce backend requests to the generic report provider.

A fourth aspect, combinable with any of the previous aspects, comprising mapping metadata data elements to user interface elements implementing formatting functionality according to data types in the ODATA metadata document.

A fifth aspect, combinable with any of the previous aspects, comprising transmitting the client state data to the server.

A sixth aspect, combinable with any of the previous aspects, comprising binding user interface elements to on-demand reporting services.

For the second implementation:

A first aspect, combinable with the general implementation, wherein the received data request triggers execution of reporting execution in an on-premise system.

A second aspect, combinable with any of the previous aspects, wherein query results from the triggered report execution are returned to the generic report provider as either a single entity or a feed of data.

A third aspect, combinable with any of the previous aspects, comprising serializing query results into a data format supported by ODATA.

A fourth aspect, combinable with any of the previous aspects, comprising rendering the query results onto a UI Screen for the user according to a defined mapping.

A fifth aspect, combinable with any of the previous aspects, wherein the defined mapping comprising defining a mapping of metadata elements of an ODATA metadata document to user interface elements.

A sixth aspect, combinable with any of the previous aspects, comprising mapping query results to corresponding user interface elements.

The subject matter described in this specification can be implemented in particular implementations so as to realize one or more of the following advantages. First, a generic framework is made available allowing the reuse of various query frameworks available in on-premise systems in the context of new on-demand applications. Up to now, particular wrappers for a query (e.g., generating reports) needed to be re-implemented if to be used with an on-demand application. Second, organizations can migrate their various application functionalities (e.g., ad-hoc reporting functionality) based on existing query frameworks in on-premise enterprise resource planning (ERP) systems. This largely preserves prior investments into developing the application functionalities. Third, organizations can migrate the application functionalities to a cloud-computing environment. Fourth, lower maintenance costs and simpler support for new end-consumer devices (e.g., mobile phones, tablets, etc.) are a result of the use of the generic framework. Fifth, functionality of on-premise query frameworks hosted on various systems in a system landscape can be combined in the context of a new on-demand application (e.g., different queries defined with the help of legacy query frameworks in two or more on-premise systems). The new on-demand framework can access those queries in the connected on-premise systems and combine corresponding result sets in a new on-demand service. Other advantages will be apparent to those skilled in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

The following detailed description is presented to enable any person skilled in the art to make, use, and/or practice the disclosed subject matter, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

For the purposes of this disclosure, an enterprise resource planning (ERP) system integrates both internal and external organizational management information across the entire organization. ERP system applications assist the organization to manage financial/accounting, manufacturing, sales and service, customer relationship management, human resources, and other suitable functions and enable the flow of information between all business functions of the organization. The ERP is designed to aggregate, synthesize, and personalize information for organizational stakeholders who can use the presented information to make decisions for the organization.

Organizations using ERP system have typically invested large amounts of time and money for the definition and implementation of application functionalities, including ad-hoc reporting and other functionalities, based on existing query frameworks in on-premise ERP systems. For example, some organizations can have hundreds of custom reporting queries in use for daily business. The implementations can also include definitions of roles with corresponding user privileges for data access to business data. In the context of query frameworks, an ad-hoc query is a query or a report which is generated on-the-fly for a particular report, which is currently needed, but is not of general interest. Therefore, an ad-hoc report/query is usually created with help of a visual query/report builder by an end-user or consultant for a particular task.

Today, many business applications are being migrated from an on-premise to an on-demand model requiring existing functionality to be re-implemented in the context of cloud-computing platforms. Advantages of having business applications in a cloud-computing environment include lower maintenance costs and simpler support for new end-consumer devices (e.g., mobile phones, tablets, etc.) when exposing business services allowing access to productive data in an existing on-premise landscape of a customer. Requirements for organizations regarding making existing application functionality available in the "cloud" relate to saving prior investment costs in implementations based on on-premise technologies.

Figure 1:
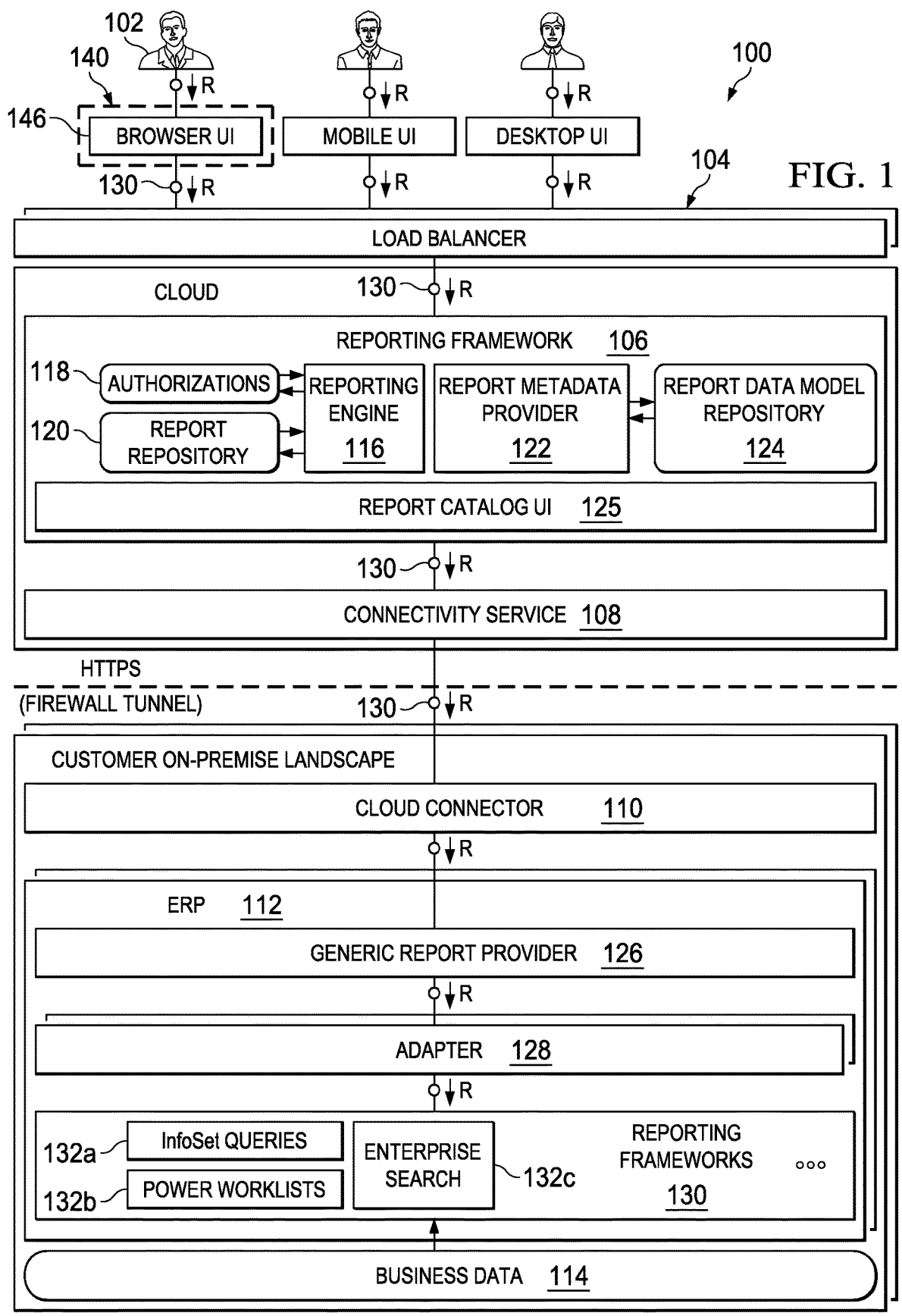
FIG. 1 is a high-level architecture block diagram illustrating an example distributed computing system (EDCS) for allowing reuse of existing on-premise query frameworks to build new on-demand services according to an implementation.

FIG. 1 is a high-level architecture block diagram illustrating an example distributed computing system (EDCS) 100 for allowing reuse of existing on-premise query frameworks to build new on-demand services according to an implementation. At a high level, the illustrated EDCS 100 includes or is made up of one or more communicably coupled computers (see FIG. 4) that communicate across a network 130 operating within a cloud-computing-based environment. The illustrated EDCS 100 includes a user 102 (e.g., developer, marketing manager, chief-financial officer, or any other user), a client 140 with an associated client application 146, a load balancer 104, a reporting framework 106, a connectivity service 108, a cloud connector 110, an ERP system 112, and business data 114. Although the detailed description is focused on reporting functionality, other functionality is envisioned to be covered by the described subject matter. Discussion of reporting functionality is not intended to limit the detailed description to only reporting functionality and/or to limit the detailed description in any way.

User 102 is the "end-user" of the system. There are typically two types of end-users. The first type of end-user is an application designer and developer. This type of end-user interacts with the framework on a rather technical level and knows details about the functionality of existing reports and queries in on-premise systems. This type of end-user also decides which reports/queries to use in the context of a new on-demand application (e.g., uses the Report Catalog UI (125) described below to select the appropriate queries and the corresponding metadata which will be used in the application). The second type of end user is the application user. This end-user interacts with the application and is typically not aware of the functionality of the on-demand reporting framework. Framework functionality is utilized by the application to provide the needed data to the second type of end-user.

The report catalog UI 125 is a cloud-based application which typically provides browsing functionality through exposed on-premise queries. This functionality is needed by application developers and designers to choose an appropriate query for their application which provides the needed data. Additionally report catalog UI 125 allows registration of on-premise queries which are supposed to be exposed by the on-demand framework.

The client 140 may be any computing device operable to connect to and/or communicate with at least the load balancer 104 and/or the reporting framework 106 (or components interfacing with either—whether or not illustrated). In general, the client 140 comprises an electronic computing device operable to receive, transmit, process, and store any appropriate data associated with the EDCS 100. More particularly, among other things, the client 140 can collect content from the client 140 and upload the collected content to the reporting framework 106 or other component of the EDCS 100. There may be any number of clients 140 associated with, or external to, the EDCS 100.

The client application 146 is any type of application that allows the client 140 to navigate to/from, request, view, create, edit, delete, administer, and/or manipulate content associated with the client 140 and any other component of the EDCS 100. For example, the client application 146 can present GUI displays and associated data to a user 102 that is generated/transmitted by the reporting framework. In some implementations, the client application 146 can also be used perform administrative functions related to the client 140 or any other component of the EDCS 100.

The on-demand services are typically not accessed directly. Load balancing functionality which is provided in the context of the overall cloud infrastructure is responsible for dispatching incoming request to server instances taking into account overall network traffic. Load balancer 104 provides functionality to distribute requests/workloads across multiple computing resources, such as computers, network links, CPUs, and/or disk drives to optimize resource use, maximize throughput, minimize response time, and avoid overload of any one of the resources. The load balancer 104 helps distribute requests/workload to various components of the cloud-based computing environment (particularly to the reporting framework 106 and/or connectivity service 108).

The reporting framework 106 is deployed to one or more servers associated with an on-demand platform (e.g., the cloud-computing-based environment) and consists of various building blocks. The reporting framework 106 building blocks include a reporting engine 116 (accessing authorizations 118 and a report repository 120), and a report metadata provider 122 access a report data model repository 124, and a report catalog UI 125. The report catalog UI 125 lists what reports are available from the customer on-premise landscape through the reporting framework 106. The reporting framework 106 can be utilized by new on-demand applications (e.g., client applications 146 executing on client 140) using an open API (see e.g., FIG. 4 API 412). This allows the building of on-demand applications, which consume existing reporting functionality provided in a network (e.g., network 130)-connected customer on-premise landscape.

The reporting engine 116 is a central part of the on-demand reporting framework. The reporting engine 116 deals with all runtime-aspects of incoming requests. Central tasks include authorization checks, mapping of input-parameters to the corresponding selection parameters of utilized on premise query/reporting frameworks, routing of incoming requests to the on-premise systems, and serialization of result-sets to open data protocol (ODATA)-responses.

In some implementations, on-demand applications 146 can take into account all defined reporting functionality with the corresponding authorizations 118 and report data model 124. Note that on-premise query/frameworks have their own role and authorization concepts. When an on-premise end-user (e.g., user 102) works with this type of framework, an administrator usually has to grant the needed authorizations to the end-user. After the assignment, the end-user is able to utilize the needed reporting functionality. The here-described on-demand framework uses APIs of on-premise query/reporting frameworks (e.g., reporting frameworks 130 described below) to retrieve role and authorization information and stores this information in a cloud repository (e.g., authorizations 118). The information retrieved from the various connected on-premise systems is exposed using a unified API. Thus, there is no need for an end-consumer application developer to deal with the various APIs of the utilized on-premise frameworks.

Authorizations 118 can be checked on various levels. On the first level there might be authorizations to execute queries in a particular system (e.g., not every end-user is allowed to access queries hosted in an ERP-system responsible for storing accounting data, HR-data, . . . , etc. as these are authorizations typically on system landscape level. Next level are authorizations on a query level (e.g., an end-user might be allowed to access the system with an accounting date, but is not allowed to see result-sets delivered by particular query). Another level can deal with elements of a result set (e.g., a user can execute a particular query, but is not allowed to see all columns of the result set). The authorizations 118 repository can be implemented in any kind of storage system (e.g., a relational database, a column-oriented, in-memory database, etc.).

The report repository 120 typically stores a list of exposed on-premise reports/queries. For every exposed query, a unique identifier, destination of the hosing on-premise systems, unique identifier for the corresponding legacy query framework, a query description, and/or information related to the query selection parameter are stored. This information is exposed using a unified API and can be used to trigger reports/queries in on-premises systems (e.g., ERP 112 below). The report repository 120 can be implemented in any kind of storage system (e.g., a relational database, a column-oriented in-memory database, etc.).

The report metadata provider 122 provides information regarding the structure of the result sets of exposed on-premise queries/reports. It typically describes the data types of the result-set rows. This information is needed by application designers and developers to bind the data to UI elements and to perform corresponding data formatting (e.g., currency conversions, time zone conversion, etc.). The reporting engine 116 also uses the report metadata stored in report data model repository 124 during the serialization of result sets to the final request response which is sent to an end-user (e.g., as an ODATA document in XML or JSON format). The reporting engine 116 looks up the metadata related to each element of a result-set provided by the on-premise query/reporting framework 130 and performs corresponding serialization taking into account element data types, etc. (e.g., string, integer, float, etc.).

The report data model repository 124 is the storage where metadata of exposed on-premise reports/queries is stored. For every exposed query, a unique identifier, together with an appropriate description of the structure of rows in the query result-sets, are stored (e.g., in an XML based file). Note that the unique identifier is identical to the identifier in the report repository 120 in order to have a one-to-one relationship. The report data model repository 124 can be implemented in any kind of storage system (e.g., a relational database, a column-oriented in-memory database, etc.).

The reporting framework 106 provides proxy-reports to on-demand applications 146. The proxy-reports are those reports configured in the report repository 120. Every proxy report in the on-demand landscape corresponds to a legacy report in an on-premise system. An on-demand service which uses reporting functionality provided by on-premise reports, in fact interacts with a proxy for the reports. The proxy configuration in the report repository stores additional information such as system destinations. When an application accesses reporting functionality using the reporting engine, the reporting engine retrieves the proxy information from the repository and interacts with the on-premise system (e.g., routing of request, mapping of input parameters etc.— e.g., see 308 in FIG. 3) according to the configuration information.

The proxy-reports access the corresponding on-premise reports over secure tunneling mechanisms provided by the cloud-based computing system connectivity service 108 and cloud-connector 110 to access the generic report provider 126. The connectivity service 108 is a central component of the cloud infrastructure. It exposes functionality using an application programming interface (API) to configure destinations to on-premise systems in customer landscapes (or even other cloud services). Secure communication tunnels are established to the corresponding destinations and on-demand applications can use these destinations to communicate with on-premise services without the need to care about technical communication aspects (e.g., firewalls). This cloud connector 110 is the on-premise counter-part to the connectivity service 108. The communication tunnel through the firewall is provided by these two components. Additionally the cloud connector 110 routes incoming requests from on-demand applications to the corresponding on-premise ERP systems. In other words, the connectivity server 108 and the cloud connector 110 provides functionality to establish secure, on-demand connectivity from on-demand-applications to on-premise systems in customer-landscapes and vice versa. The two components open a tunnel through customer firewalls to allow secure communication. The connectivity functionality is exposed to applications by an appropriate API.

The ERP 112 is an on-premise legacy system which classically deals with aspects of enterprise resource planning like financials, sales, CRM, controlling, etc. The ERP 112 systems are typically implemented based on standard proprietary software and support query/reporting functionality based on proprietary standard query frameworks (e.g., reporting frameworks 130).

The ERP 112 includes a generic report provider 126/ adaptor 128 delivered/deployed as an add-on (e.g., plug-in, installed application, etc.) to existing on-premise ERP systems 112 executing in a customer on-premise landscape. The generic report provider 126 is hosted in every connected on-premise system exposing query/reporting functionality to the on-demand world. The overall generic functionality is deployed as an add-on component to installed legacy on-premise systems. The generic report provider 126 is triggered by requests from the reporting engine 116 and dispatches requests to a corresponding on-premise query framework 130 (e.g., 132a, 132b, 132c, etc.) based on provided parameters (e.g., a query identifier, a query framework identifier, a selection parameter, etc.). The generic report provider 126 uses the adapters 128 (e.g., adapter 128) to interact with the legacy query/reporting frameworks (e.g., the illustrated InfoSet Queries 132a, Power Worklists 132b, Enterprise Search 132c, etc.) that access business data 114 to provide reports based on queries. For every connected on-premise query/reporting framework 130, an adapter 128 has to be provided which is used by the generic report provider 126 to trigger a query based on provided input parameters. The adapters 128 implement a defined API which translates provided input parameters from the on-demand world to the parameters of the on-premise queries/reports. Note that adapters for alternative query frameworks (not illustrated) can be implemented based on APIs (e.g., commercial, custom, etc.) depending on user needs. The generic report provider 126 provides functionality to access ERP modeled queries using the adapters 128 in order to provide administrative data (e.g., authorizations, roles, etc.) the report data models (e.g., query metadata) and business data collected by executing the corresponding queries in the ERP system. The reporting framework 106 communicates with the generic report provider 126 using standardized protocols (e.g., HTTPS, RFC, etc.).

The reporting frameworks 130 associated with the ERP 112 can be used to create reports relating to business data 114 with little-to-no knowledge of underlying detailed programming languages. The reporting frameworks 130 are legacy query/reporting frameworks implemented in existing ERP 112 systems. The frameworks are typically utilized by companies to execute reporting tasks and/or provide generic query functionality to on-premise applications using a defined API. Business data 114 is typically stored in connected database systems (e.g., relational database systems like ORACLE or in-memory database systems like SAP-HANA). The data is accessed from business applications or frameworks using structure query language (SQL) or other query language. The reporting frameworks 130 offer a broad range of methods to define reports and create different types of reports (e.g., basic list, statistics, and ranked lists). Report output can include, for example, lists in table format, grids, downloadable spreadsheets, downloadable flat files, etc. Note that user interface technology used by the reporting frameworks is typically proprietary/custom and makes it difficult to interface reporting framework outputs with modern mobile devices/user interface technologies (e.g., HTML 5, FIORI, etc.) and protocols (e.g., ODATA, etc.) without accessing each ERP system to trigger queries, working out role/authorization issues, and then to export/post-process the reporting framework output for a desired user presentation.

ODATA is a generic web protocol for querying and updating data over networks and allows for a user to request data from a data source over the Hypertext Transfer Protocol and receive results back from the data source in ODATA format or other formats such as Atom Publishing Protocol (Atom), JAVASCRIPT Object Notation (JSON), and Extensible Markup Language (XML), etc. The ODATA protocol is increasingly used by mobile computing and other computing platforms, such as smartphones and tablet computers, as an important method of access to information over networks. As will be appreciated by those skilled in the art, the use of ODATA, HTTP(S), RFC, XML/JSON, and the like can be substituted for other protocols, computer languages, etc. The exemplary use of a protocol, computer language, etc. in this disclosure is not meant to be limiting in any way. Other appropriately formatted requests in any protocol and/or computer language are also considered to be within this scope of this disclosure.

Users are able to "wrap" existing reporting framework query functionality in a generic way using add-on functionality which exposes query results as open/generic ODATA-services. This allows reuse of legacy query frameworks in the context of new applications based on modern UI technologies due to the fact that the ODATA standard is supported. The generic add-on functionality can be deployed to various ERP systems in a customer on-premise landscape.

Figure 2:
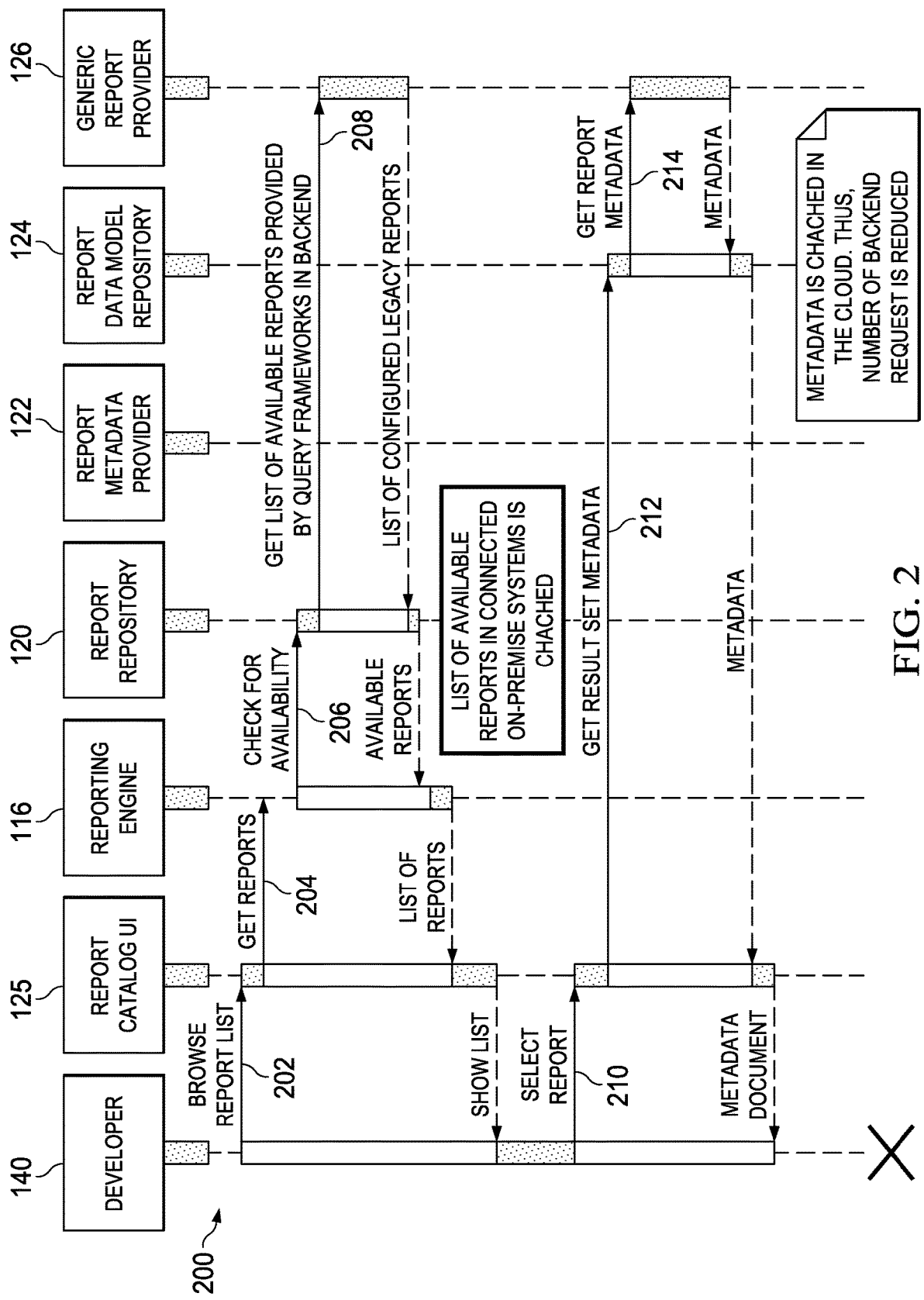
FIG. 2 is a sequence diagram illustrating design-time integration of data provided by existing query frameworks into a new application using an on-demand reporting framework according to an implementation.

FIG. 2 is a sequence diagram of method 200 illustrating design-time integration of data provided by existing query frameworks into a new application using an on-demand reporting framework according to an implementation. For clarity of presentation, the description that follows generally describes method 200 in the context of FIGS. 1 and 3-4. However, it will be understood that method 200 may be performed, for example, by any other suitable system, environment, software, and hardware, or a combination of systems, environments, software, and hardware as appropriate. In some implementations, various steps of method 200 can be run in parallel, in combination, in loops, and/or in any order.

In some implementations, at design time, a developer integrates data provided by existing query frameworks in on-premise backend (e.g., ERP) systems into new applications and presents data elements on various UI screens by using the above-described reporting framework.

At 202, a developer (e.g., using a client) browses a report catalog using the report catalog UI of the reporting framework listing reports available from the customer on-premise landscape through the reporting framework. From 202, method 200 proceeds to 204.

At 204, the report catalog UI developer initiates retrieval of available reports and a request is made to the reporting engine for available reports. From 204, method 200 proceeds to 206.

At 206, the reporting engine checks for availability of reports from the report repository. In some implementations, a list of available reports in connected on-premise systems is cached. From 206, method 200 proceeds to 208.

At 208, the report repository requests a list of available reports from the generic report provider. The list is returned to the report repository from the generic report provider and transmitted successively to the reporting engine, report catalog UI and the developer. From 208, method 200 proceeds to 210.

At 210, the developer initiates retrieval of one or more selected report(s) from the returned list of available reports and a request is made to the report catalog UI for the one or more selected report(s). From 210, method 200 proceeds to 212.

At 212, the report catalog UI requests the result set metadata from the metadata repository. From 212, method 200 proceeds to 214.

At 214, the metadata repository initiates a request to the generic report provider for report metadata. Metadata related to the selected reports (e.g., a description of result set structure, data types of fields, etc.) is generated as an ODATA metadata document. The report metadata is returned to the metadata repository from the generic report provider and transmitted successively to the report catalog UI and the developer. In some implementations, the report metadata is cached by the metadata repository, for example, to reduce the number of backend requests to the generic report provider.

In some implementations, the developer maps result set data elements to UI elements and implements formatting functionality according to the data types in the returned metadata document (e.g. currency conversion/display, time, etc.). This includes the definition of query selection parameters which define the data supposed to be displayed. The developer can also bind UI-Elements to on-demand reporting services (e.g., HTTP requests based on the ODATA protocol). After 214, method 200 stops.

Figure 3:
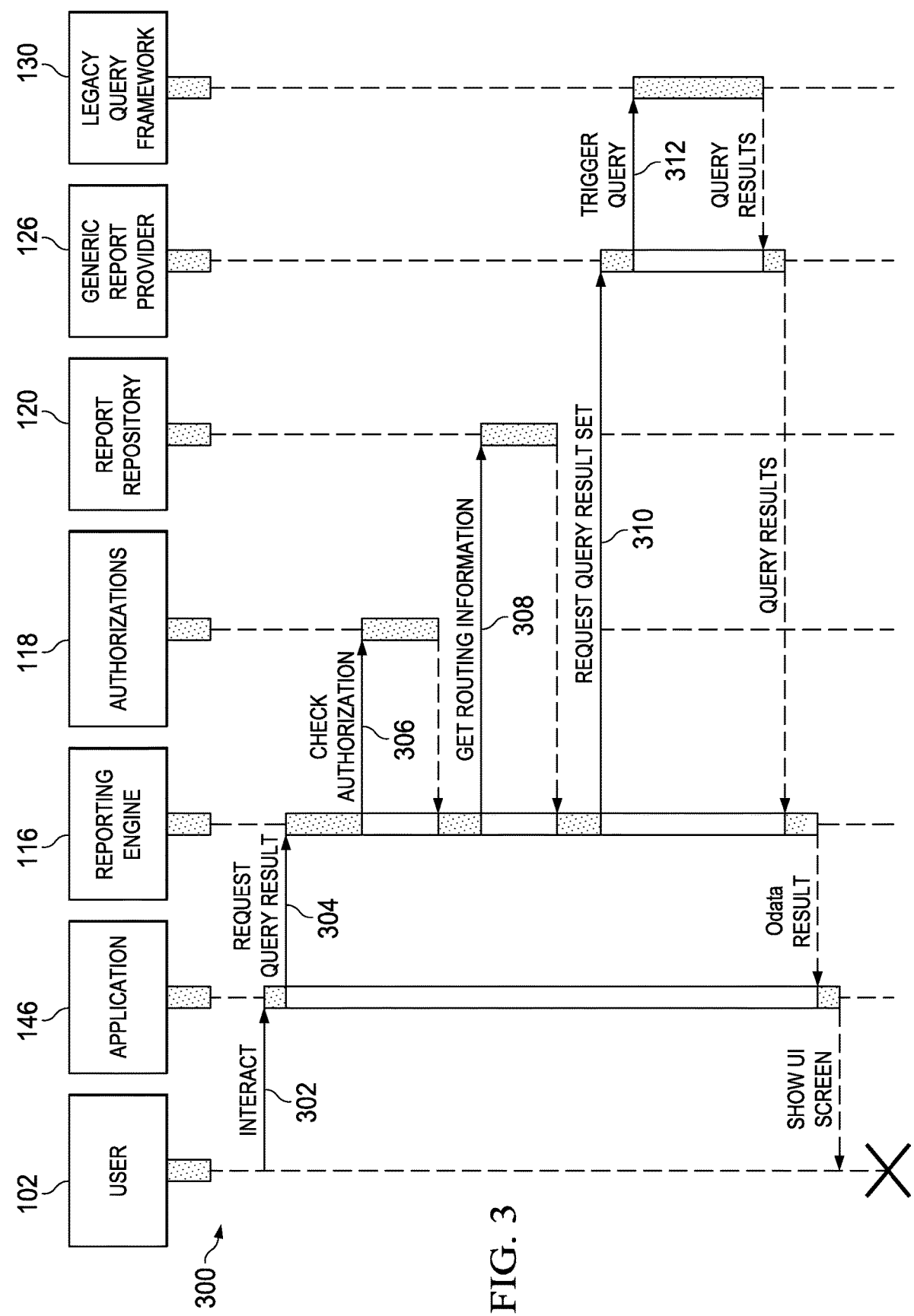
FIG. 3 is a sequence diagram illustrating run-time data retrieval using an open data protocol (ODATA) service exposed in the context of the on-demand reporting framework according to an implementation.

FIG. 3 is a sequence diagram of method 300 illustrating run-time data retrieval using an ODATA service exposed in the context of the on-demand reporting framework according to an implementation. For clarity of presentation, the description that follows generally describes method 300 in the context of FIGS. 1-2 and 4. However, it will be understood that method 300 may be performed, for example, by any other suitable system, environment, software, and hardware, or a combination of systems, environments, software, and hardware as appropriate. In some implementations, various steps of method 300 can be run in parallel, in combination, in loops, and/or in any order.

In some implementations, at run time, an application use triggers an update of UI elements (e.g., status, informational text, tables, etc.), which are bound to one or several report result sets provided by a reporting framework. The corresponding data is then retrieved using an ODATA service exposed in the context of the above-described reporting framework.

At 302, a user (using a client) interacts with an on-demand application with UI elements bound to data elements provided by on-premise query frameworks. From 302, method 300 proceeds to 304.

At 304, the on-demand application UI elements trigger data requests to the reporting engine for bound result set elements provided by on-demand services (e.g., a service request which triggers execution of reporting execution in an on-premise system). From 304, method 300 proceeds to 306.

At 306, the reporting engine checks for user authorization to access requested data using an authorizations repository (as described above). Authorizations are returned to the reporting engine. From 306, method 300 proceeds to 308.

At 308, with proper authorization, the reporting engine requests routing information for applicable back-end ERP systems from the report repository. The routing information is returned to the reporting engine. From 308, method 300 proceeds to 310.

At 310, the reporting engine, using the routing information, routes requests to the generic report provider of appropriate backend ERP systems. From 310, method 300 proceeds to 312.

At 312, the generic report provider triggers report(s) execution(s) using corresponding adapters from appropriate query frameworks. The query results are returned to the generic report provider as either a single entity or a feed of data. The reporting engine serializes any result sets into a data format supported by ODATA (e.g., JSON, XML, etc.) and transmits the serialized data successively to the reporting engine, application, and to the user. The application renders the result set (or result element) onto a UI Screen for the user according to a defined mapping. For example, mapping can be performed in two steps: First a developer/designer of an application/UI screen defines a mapping of metadata elements of the ODATA metadata document to screen elements (e.g., if a particular on-demand query service delivers result sets where on column represents first name, another one to the last-name, and so on). The UI designer binds the first-names to a particular screen position (e.g., first column in a UI-table) and the last-names to another position (e.g., second column), etc. During runtime, the application maps the retrieved row-elements of the result sets based on the metadata document to the corresponding UI-elements.

Therefore, the UI-designer defines the mapping according a desired visual experience, usability aspect, etc. This mapping is realized by coding a corresponding UI-screen in an appropriate programming language for a corresponding device. The actual rendering of data into screen elements (e.g., filling tables) is done during runtime based on the designed and implemented mapping. After 312, method 300 stops.

Figure 4:
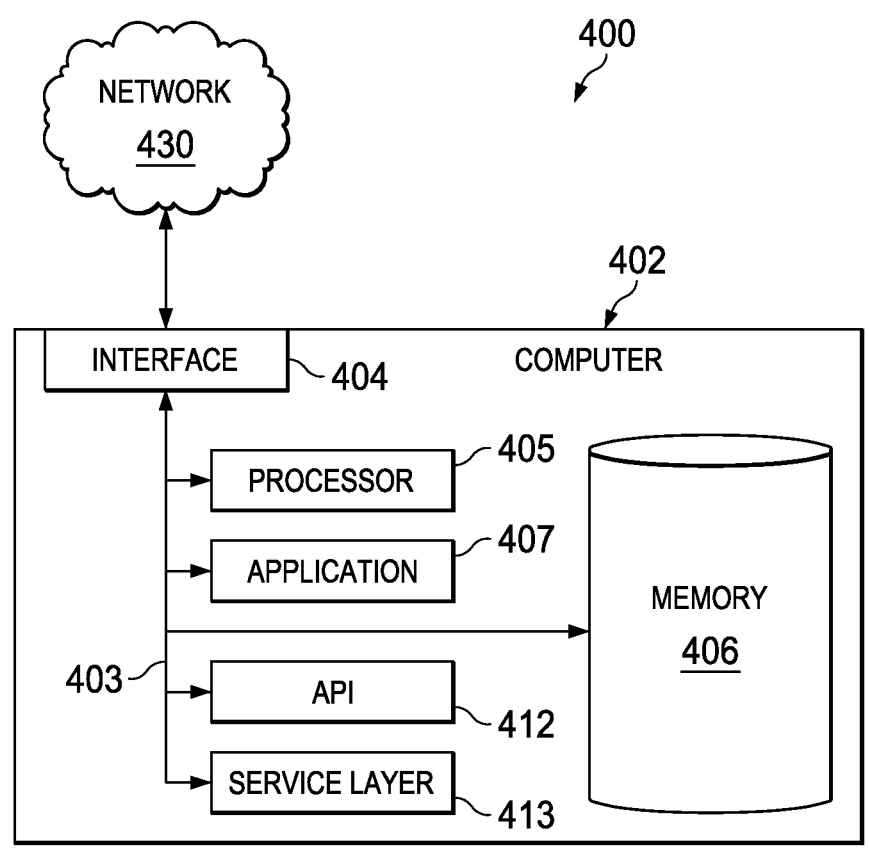
FIG. 4 is a block diagram of an exemplary computer used in the EDCS according to an implementation.

FIG. 4 is a block diagram 400 of an exemplary computer 402 used in the EDCS 100 according to an implementation. The illustrated computer 402 is intended to encompass any computing device such as a server, desktop computer, laptop/notebook computer, wireless data port, smart phone, personal data assistant (PDA), tablet computing device, one or more processors within these devices, or any other suitable processing device, including both physical and/or virtual instances of the computing device. Additionally, the computer 402 may comprise a computer that includes an input device, such as a keypad, keyboard, touch screen, or other device that can accept user information, and an output device that conveys information associated with the operation of the computer 402, including digital data, visual and/or audio information, or a GUI.

The computer 402 can serve as a client (e.g., client 102), network component (e.g., load balancer 104), a server (e.g., running the reporting engine 116, report metadata provider 122, generic report provider 126, etc.), a database or other persistency (e.g., report repository 120, report data model repository 124, etc.), and/or any other component of the EDCS 100. The illustrated computer 402 is communicably coupled with a network 430. In some implementations, one or more components of the computer 402 may be configured to operate within a cloud-computing-based environment.

At a high level, the computer 402 is an electronic computing device operable to receive, transmit, process, store, or manage data and information associated with the EDCS 100. According to some implementations, the computer 402 may also include or be communicably coupled with an application server, e-mail server, web server, caching server, streaming data server, business intelligence (BI) server, and/or other server.

The computer 402 can receive requests over network 430 from a client application (e.g., executing on another computer 402) and responding to the received requests by processing the said requests in an appropriate software application. In addition, requests may also be sent to the computer 402 from internal users (e.g., from a command console or by other appropriate access method), external or third-parties, other automated applications, as well as any other appropriate entities, individuals, systems, or computers.

Each of the components of the computer 402 can communicate using a system bus 403. In some implementations, any and/or all the components of the computer 402, both hardware and/or software, may interface with each other and/or the interface 404 over the system bus 403 using an API 412 and/or a service layer 413. The API 412 may include specifications for routines, data structures, and object classes. The API 412 may be either computer-language independent or dependent and refer to a complete interface, a single function, or even a set of APIs. The service layer 413 provides software services to the computer 402 and/or the EDCS 100. The functionality of the computer 402 may be accessible for all service consumers using this service layer. Software services, such as those provided by the service layer 413, provide reusable, defined business functionalities through a defined interface. For example, the interface may be software written in JAVA, C++, or other suitable language providing data in extensible markup language (XML) format or other suitable format. While illustrated as an integrated component of the computer 402, alternative implementations may illustrate the API 412 and/or the service layer 413 as stand-alone components in relation to other components of the computer 402 and/or EDCS 100. Moreover, any or all parts of the API 412 and/or the service layer 413 may be implemented as child or sub-modules of another software module, enterprise application, or hardware module without departing from the scope of this disclosure.

The computer 402 includes an interface 404. Although illustrated as a single interface 404 in FIG. 4, two or more interfaces 404 may be used according to particular needs, desires, or particular implementations of the computer 402 and/or EDCS 100. The interface 404 is used by the computer 402 for communicating with other systems in a distributed environment—including within the EDCS 100—connected to the network 430 (whether illustrated or not). Generally, the interface 404 comprises logic encoded in software and/or hardware in a suitable combination and operable to communicate with the network 430. More specifically, the interface 404 may comprise software supporting one or more communication protocols associated with communications such that the network 430 or interface's hardware is operable to communicate physical signals within and outside of the illustrated EDCS 100.

The computer 402 includes a processor 405. Although illustrated as a single processor 405 in FIG. 4, two or more processors may be used according to particular needs, desires, or particular implementations of the computer 402 and/or the EDCS 100. Generally, the processor 405 executes instructions and manipulates data to perform the operations of the computer 402. Specifically, the processor 405 executes the functionality required for allowing reuse of existing on-premise query frameworks to build new on-demand services.

The computer 402 also includes a memory 406 that holds data for the computer 402 and/or other components of the EDCS 100. Although illustrated as a single memory 406 in FIG. 4, two or more memories may be used according to particular needs, desires, or particular implementations of the computer 402 and/or the EDCS 100. While memory 406 is illustrated as an integral component of the computer 402, in alternative implementations, memory 406 can be external to the computer 402 and/or the EDCS 100.

The application 407 is an algorithmic software engine providing functionality according to particular needs, desires, or particular implementations of the computer 402 and/or the EDCS 100, particularly with respect to functionality required for allowing reuse of existing on-premise query frameworks to build new on-demand services. For example, application 407 can serve as the a browser/mobile/desktop UI 146, reporting engine 116, report metadata provider 122, generic report provider 126, adapter 128, and/or other application associated with the computer 402 and/or the EDCS 100. Further, although illustrated as a single application 407, the application 407 may be implemented as multiple applications 407 on the computer 402. In addition, although illustrated as integral to the computer 402, in alternative implementations, the application 407 can be external to the computer 402 and/or the EDCS 100.

There may be any number of computers 402 associated with, or external to, the EDCS 100 and communicating over network 430. Further, the term "client," "user," and other appropriate terminology may be used interchangeably as appropriate without departing from the scope of this disclosure. Moreover, this disclosure contemplates that many users may use one computer 402, or that one user may use multiple computers 402.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus," "computer," or "electronic computer device" (or equivalent as understood by one of ordinary skill in the art) refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method comprising:
   at design-time:
   receiving a request for reports from a client system and at a reporting engine of a cloud-based computing system comprising a report repository, a system connectivity service, a report catalog user interface, and a report data model repository;
   transmitting a request for available reports from the reporting engine to the report repository, wherein a proxy-report corresponding to a legacy report in an on-premises system is returned in response to the request for available reports transmitted to the report repository, wherein the on-premises system comprises a cloud-connector and a back-end enterprise resource planning (ERP) system, and wherein the back-end ERP system comprises a generic report provider;
   transmitting a request for available reports from the report repository to the generic report provider using a proxy configuration from the proxy-report and a secure tunneling mechanism provided by communication between the system connectivity service provided by the cloud-based computing system and the cloud-connector provided by the on-premises system;
   transmitting a request from the client system to the report catalog user interface for a selected report of a list of reports returned in response to the transmitted request to the generic report provider;

transmitting a request for metadata associated with the list of reports from the report catalog user interface to the report data model repository;

transmitting a request for the metadata from the report data model repository to the generic report provider;

caching the metadata returned by the generic report provider in the report data model repository as cached metadata to reduce back-end requests to the generic report provider; and serializing query results with the cached metadata into a data format supported by ODATA using particular data types of each element of a bound result set provided in a response to a data request for bound result set elements.

2. The method of claim 1, wherein the available reports are cached.

3. The method of claim 1, wherein the metadata includes a description of result set structure and data types of fields and is generated as an ODATA metadata document.

4. The method of claim 3, comprising caching available reports returned by the generic report provider.

5. The method of claim 3, comprising mapping metadata data elements to user interface elements implementing formatting functionality according to data types in the ODATA metadata document.

6. The method of claim 1, comprising transmitting the client state data to the server.

7. The method of claim 1, comprising binding user interface elements to on-demand reporting services.

8. A computer-implemented method comprising:
at run-time:
receiving a data request as a received data request for bound result set elements provided by on-demand services from a client system and at a reporting engine of a cloud-based computing system comprising an authorizations repository, a report repository, and a system connectivity service;

checking, by the reporting engine, authorization for access to requested bound result set elements using the authorizations repository;

requesting, by the reporting engine, routing information for applicable back-end enterprise resource planning (ERP) systems from the report repository, wherein a proxy-report corresponding to a legacy report in an on-premises system is returned in response to the request for routing information, wherein the on-premises system comprises a cloud-connector and an appropriate back-end ERP system, and wherein the appropriate back-end ERP system comprises a generic report provider;

routing requests from the reporting engine to the generic report provider using a proxy configuration from the proxy-report
and a secure tunneling mechanism provided by communication between the system connectivity service provided by the cloud-based computing system and the cloud-connector provided by the on-premises system;

triggering, by the generic report provider, a report execution as a triggered report execution using a corresponding adapter from an appropriate query framework on the appropriate back-end ERP system; and creating a response to the data request by serializing query results from the triggered report execution into a data format supported by ODATA by using cached metadata and a data type of each element of the query results, wherein serialization of the query results uses particular data types of each element of a bound result set provided in the response to the data request.

9. The method of claim 8, wherein the received data request triggers execution of reporting execution in an on-premise system.

10. The method of claim 9, wherein query results from the triggered report execution are returned to the generic report provider as either a single entity or a feed of data.

11. The method of claim 10, comprising requesting routing information for applicable back-end ERP systems from the report repository.

12. The method of claim 10, comprising rendering the query results onto a UI Screen for a user according to a defined mapping.

13. The method of claim 12, wherein the defined mapping comprising defining a mapping of metadata elements of an ODATA metadata document to user interface elements.

14. The method of claim 13, comprising mapping query results to corresponding user interface elements.

15. A non-transitory, computer-readable medium storing computer-readable instructions executable by a computer and configured to:
at design-time:
receive a request for reports from a client system and at a reporting engine of a cloud-based computing system comprising a report repository, a system connectivity service, a report catalog user interface, and a report data model repository;

transmit a request for available reports from the reporting engine to the report repository, wherein a proxy-report corresponding to a legacy report in an on-premises system is returned in response to the request for available reports transmitted to the report repository, wherein the on-premises system comprises a cloud-connector and a back-end enterprise resource planning (ERP) system, and wherein the back-end ERP system comprises a generic report provider;

transmit a request for available reports from the report repository to the generic report provider using a proxy configuration from the proxy-report and a secure tunneling mechanism provided by communication between the system connectivity service provided by the cloud-based computing system and the cloud-connector provided by the on-premises system;

transmit a request as a transmitted request from the client system to the report catalog user interface for a selected report of a list of reports returned in response to the transmitted request to the generic report provider;

transmit a request for metadata associated with the list of reports from the report catalog user interface to the report data model repository;

transmit a request for the metadata from the report data model repository to the generic report provider;

caching the metadata returned by the generic report provider in the report data model repository as cached metadata to reduce back-end requests to the generic report provider; and serializing query results with the cached metadata into a data format supported by ODATA using particular data types of each element of a bound result set provided in a response to a data request for bound result set elements.

16. The computer-readable medium of claim 15, wherein the metadata includes a description of result set structure and data types of fields and is generated as an ODATA metadata document.

17. The computer-readable medium of claim 16, comprising instructions to map metadata data elements to user interface elements implementing formatting functionality according to data types in the ODATA metadata document.

18. A non-transitory, computer-readable medium storing computer-readable instructions executable by a computer and configured to:

at run-time:

receive a data request as a received data request for bound result set elements provided by on-demand services from a client system and at a reporting engine of a cloud-based computing system comprising an authorizations repository, a report repository, and a system connectivity service;

check, by the reporting engine, authorization for access to requested bound result set elements using the authorizations repository;

request, by the reporting engine, routing information for applicable back-end enterprise resource planning (ERP) systems from the report repository, wherein a proxy-report corresponding to a legacy report in an on-premises system is returned in response to the request for routing information, wherein the on-premises system comprises a cloud-connector and an appropriate back-end ERP system, and wherein the appropriate back-end ERP system comprises a generic report provider;

route requests from the reporting engine to the generic report provider using a proxy configuration from the proxy-report and a secure tunneling mechanism provided by communication between the system connectivity service provided by the cloud-based computing system and the cloud-connector provided by the on-premises system;

trigger, by the generic report provider, a report execution as a triggered report execution using a corresponding adapter from an appropriate query framework on the appropriate back-end ERP system; and create a response to the data request by serializing query results from the triggered report execution into a data format supported by ODATA by using cached metadata and a data type of each element of the query results, wherein serialization of the query results uses particular data types of each element of a bound result set provided in the response to the data request.

19. The computer-readable medium of claim 18, wherein the received data request triggers execution of reporting execution in an on-premise system.

20. The computer-readable medium of claim 19, wherein query results from the triggered report execution are returned to the generic report provider as either a single entity or a feed of data.

* * * * *